United States Patent
Chen et al.

(10) Patent No.: US 8,184,987 B2
(45) Date of Patent: May 22, 2012

(54) METHOD, SYSTEM AND DEVICE FOR REALIZING DATA TRANSMISSION EXTENSION IN PASSIVE OPTICAL NETWORK

(75) Inventors: Juan Chen, Shenzhen (CN); Shimin Zou, Shenzhen (CN); Jianlin Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 288 days.

(21) Appl. No.: 12/684,412

(22) Filed: Jan. 8, 2010

(65) Prior Publication Data

US 2010/0111532 A1  May 6, 2010

Related U.S. Application Data

(63) Continuation of application No. PCT/CN2008/071880, filed on Aug. 5, 2008.

(30) Foreign Application Priority Data

Aug. 10, 2007 (CN) .......................... 2007 1 0140504

(51) Int. Cl.
*H04B 10/02* (2006.01)
(52) U.S. Cl. ........ 398/176; 398/173; 398/175; 398/177; 398/154; 398/155; 398/158; 398/159; 398/160; 398/135; 398/136; 398/67; 398/72; 398/99; 398/100; 359/326; 359/332
(58) Field of Classification Search .................. 398/173, 398/175, 176, 177, 178, 179, 180, 181, 33, 398/38, 158, 160, 164, 97, 66, 67, 68, 69, 398/70, 71, 72, 98, 99, 100, 81, 79, 58, 159, 398/147, 25, 26, 27, 135, 136, 137, 139, 398/154, 155, 174; 359/332, 326, 330, 328
See application file for complete search history.

(56) References Cited

U.S. PATENT DOCUMENTS

| 5,576,876 A | 11/1996 | Takeyari et al. |
| 2003/0169473 A1 | 9/2003 | Cotter et al. |
| 2006/0127100 A1* | 6/2006 | Frankel et al. ............... 398/158 |
| 2006/0269291 A1 | 11/2006 | Kagawa et al. |

FOREIGN PATENT DOCUMENTS

| CN | 1866795 A | 11/2006 |
| CN | 1983837 A | 6/2007 |
| JP | 2002-271271 A | 9/2002 |
| JP | 2007-184908 A | 7/2007 |

OTHER PUBLICATIONS

State Intellectual Property Office of the People'S Republic of China, English Translation of Written Opinion of the International Searching Authority in International Patent Application No. PCT/CN2008/071880 (Nov. 6, 2008).

1st Office Action from the Chinese Patent Office in corresponding Chinese Patent Application No. 200710140504.3 (Jul. 14, 2010).

(Continued)

*Primary Examiner* — Hanh Phan (57) ABSTRACT

A method, a device, and a system for realizing data transmission extension in a passive optical network (PON) are provided. Between a burst-mode clock and data recovery (BCDR) module and an electrical-optical (E/O) amplification module, the device includes a delimiter matching module and a preamble buffering and compensating module. The delimiter matching module is adapted to receive a data frame sent by the BCDR module and determine a location of a delimiter in the data frame. An optical-electrical (O/E) amplification module performs O/E conversion, amplification, and shaping on the data frame. The BCDR module then performs clock and data recovery processing on the data frame. The preamble buffering and compensating module is adapted to receive and buffer the data frame output from the delimiter matching module, insert a compensation preamble in the data frame according to the location of the delimiter in the data frame determined by the delimiter matching module, and send the data frame to the E/O amplification module according to a retiming clock of a downstream direction. Therefore, the data transmission extension is realized in an optical-electrical-optical (OEO) manner.

11 Claims, 8 Drawing Sheets

OTHER PUBLICATIONS

First Office Action of corresponding Japanese Patent Application No. 2010-518486, mailed May 31, 2011, and English translation thereof, 7 pages total.

Suzuki et al., "B-PON Repeater for Enlarging Transmission Distance between OLT and ONT", Institute of Electronics, Information and Communication Engineers, Oct. 1, 2003, J86-B(10):2053-2064, Japan. (English Abstract Only).

Second Office Action of corresponding Japanese Patent Application No. 2010-518486, mailed Nov. 29, 2011, and English translation thereof, 7 pages total.

* cited by examiner

METHOD, SYSTEM AND DEVICE FOR REALIZING DATA TRANSMISSION EXTENSION IN PASSIVE OPTICAL NETWORK

CROSS-REFERENCE TO RELATED APPLICATIONS

This application is a continuation of International Application No. PCT/CN2008/071880, filed on Aug. 5, 2008, which claims priority to Chinese Patent Application No. 200710140504.3, filed on Aug. 10, 2007, both of which are hereby incorporated by reference in their entireties.

FIELD OF THE TECHNOLOGY

The present invention relates to the data transmission technology in a passive optical network (PON), and more particularly to a method, a system, and a device for realizing data transmission extension in the PON.

BACKGROUND OF THE INVENTION

As new services such as video on demand, high-resolution television, and online games have been gradually proposed, the users' demand for bandwidth increases day by day. The development of fiber-to-the-home technology effectively ensures the bandwidth of "last mile" access network. A passive optical network (PON) technology is currently one of the most widely applied fiber-to-the-home technologies. Currently, the PON includes a broad PON (BPON), a Gigabit PON (GPON), and an Ethernet PON (EPON).

Figure 1:
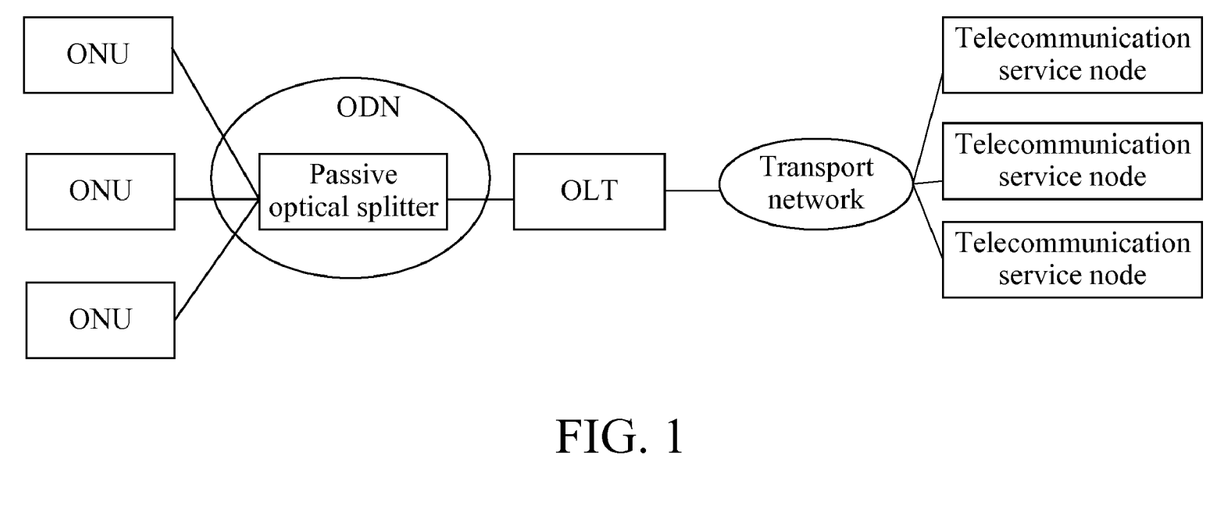
FIG. 1 is a schematic structural view of a PON network in the prior art.

FIG. 1 is a schematic structural view of a PON network in the prior art. Various services of users are transmitted through access and transport networks in the PON, such that different telecommunication service nodes can be flexibly accessed for accepting services. As shown in FIG. 1, the PON includes optical line terminals (OLTs), optical network units (ONUs), and a passive optical splitter at a PON access layer and includes a transmission network and telecommunication service nodes at a metropolitan convergence layer. User equipment (UE) accesses the metropolitan convergence layer through the PON access layer. The OLTs and the passive optical splitter are connected through a trunk optical fiber. The passive optical splitter realizes point-to-multipoint optical power distribution and is connected to a plurality of ONUs through a plurality of branch optical fibers. The ONUs are connected to the UE. The trunk optical fiber, the passive optical splitter, and the branch optical fibers between the OLTs and the ONUs are generally referred to as passive optical distribution network (ODN). The transmission of data from the OLTs to the ONUs through the ODN is a downstream direction and the transmission of data from the ONUs to the OLTs through the ODN is an upstream direction.

In the PON, as the number of ONUs interconnected to the OLTs through the passive optical splitter is relatively small, a cover radius is not longer than 20 kilometers, such that the number of OLTs is relatively large to fulfill the demands of the UE in the PON architecture, the location areas thereof are also remote and dispersed, which is inconvenient for management and maintenance, and has a high cost in establishment and maintenance of the PON. With the emerging of a next generation optical access network, a technology of extending the PON from ONUs to 100-kilometer data transmission is proposed. The technology proposes the PON objectives of 10 Gbps symmetric rate data transmission, 100-kilometer transmission distance, and 1:512 split ratio. The utilized technology is mainly an optical power amplification and wavelength division technology. In the PON, the data transmission extension simplifies the levels of networks such as the PON access layers and metropolitan convergence layers, so as to decrease the number of the network nodes, increase the number of the UEs under the administration of a single OLT, allocate the cost to the greatest extent, thereby eventually reducing the equipment cost and saving the management and maintenance cost.

Figure 2:
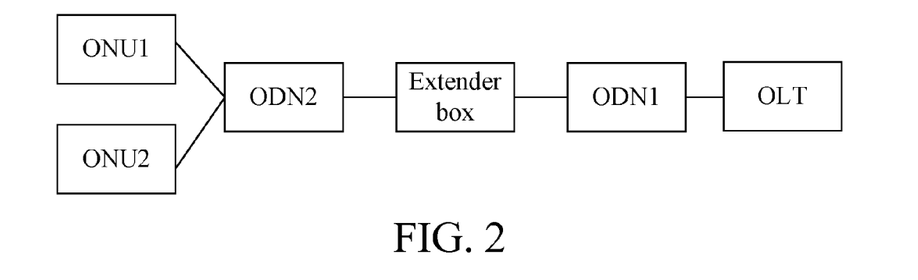
FIG. 2 is a schematic structural view of a data transmission extension network in a PON realized in an OEO manner in the prior art.

Currently, the data transmission extension in the PON may utilize regenerator extension solutions through an optical-electrical-optical (OEO) conversion manner. FIG. 2 is a schematic structural view of a data transmission extension network in a PON realized in an OEO manner in the prior art. An OEO extender box is set between the passive optical splitter and the OLTs. The OEO extender box is the OEO equipment. The OEO extender box divides conventional ODN into two ODNs, that is, an ODN 1 and an ODN 2. The OEO extender box is adapted to complete optical-electrical (O/E) conversion, burst reception, power amplification, and electrical-optical (E/O) conversion for the data of the OEO extender box and then send the processed data. Therefore, a power of the transmitted data does not gradually attenuate with the increasing of the transmission distance, such that the OLTs or ONUs receiving the data are unable to receive data.

Figure 3:
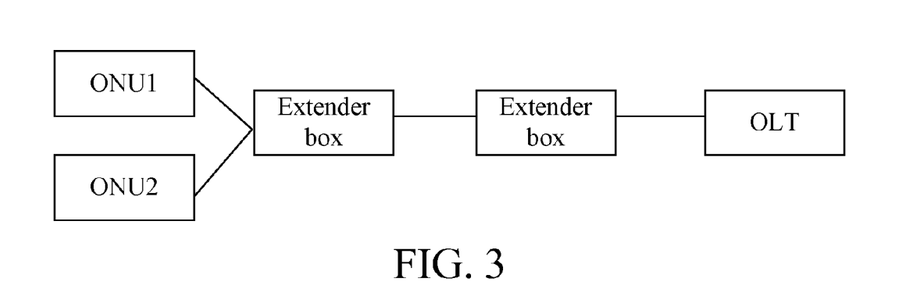
FIG. 3 is a schematic structural view of a specific configuration of an OEO extender box in the prior art.

As for the OEO extender box in FIG. 2, a specific setting location thereof is still in dispute. FIG. 3 is a schematic structural view of a specific configuration of an OEO extender box. That is, two OEO extender boxes are configured between the OLTs and the ONUs, in which one is located near the OLTs and the other is located near the passive optical splitter, that is, at the ONU side. However, the use of two OEO extender boxes is not economical. Another specific configuration of the OEO extender box is provided, that is, the OEO extender box is configured between the OLT and the ONUs, and the OEO extender box is configured near the OLT. However, this manner does not significantly improve the power budget.

Figure 4:
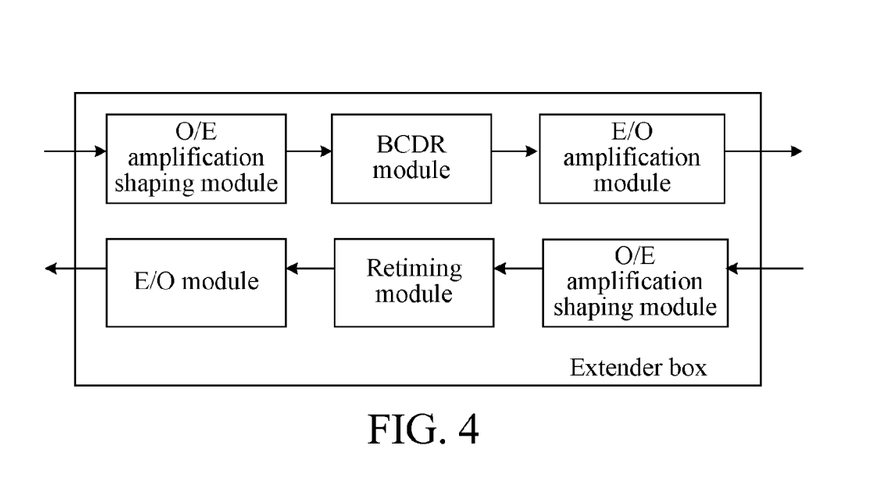
FIG. 4 is a schematic view of a basic structure of an OEO extender box in the prior art.

FIG. 4 is a schematic view of a basic structure of an OEO extender box in the prior art. In an upstream direction, an O/E amplification shaping module, a burst-mode clock and data recovery (BCDR) module, and an E/O amplification module are included. In a downstream direction, an O/E amplification shaping module, a retiming module (including a CDR module), and an E/O module are included.

In the upstream direction, as the ONU usually uses a burst-mode optical component to send data, that is, to send burst data. In order to ensure the correct data receiving of the OEO extender box or the OLTs as a receiver, a preamble needs to be added in front of a frame head of each data frame of data. Therefore, in the upstream direction, after receiving a data frame, the O/E amplification shaping module in the upstream direction in the OEO extender box performs O/E conversion, amplification, shaping on the data frame, and sends the data frame to the BCDR module for performing the BCDR, and then the data frame is sent to the E/O amplification module for performing the E/O conversion amplification according to a recovered upstream clock and then the data frame is output. In the downstream direction, after receiving the data frame, the O/E amplification shaping module in the downstream direction in the OEO extender box performs O/E conversion, amplification, and shaping on the data frame, and the clock and data recovery is then performed on the data frame through retiming, and then the data frame is sent to the E/O module for E/O conversion through the recovered downstream clock and then the data frame is output.

Figure 5:
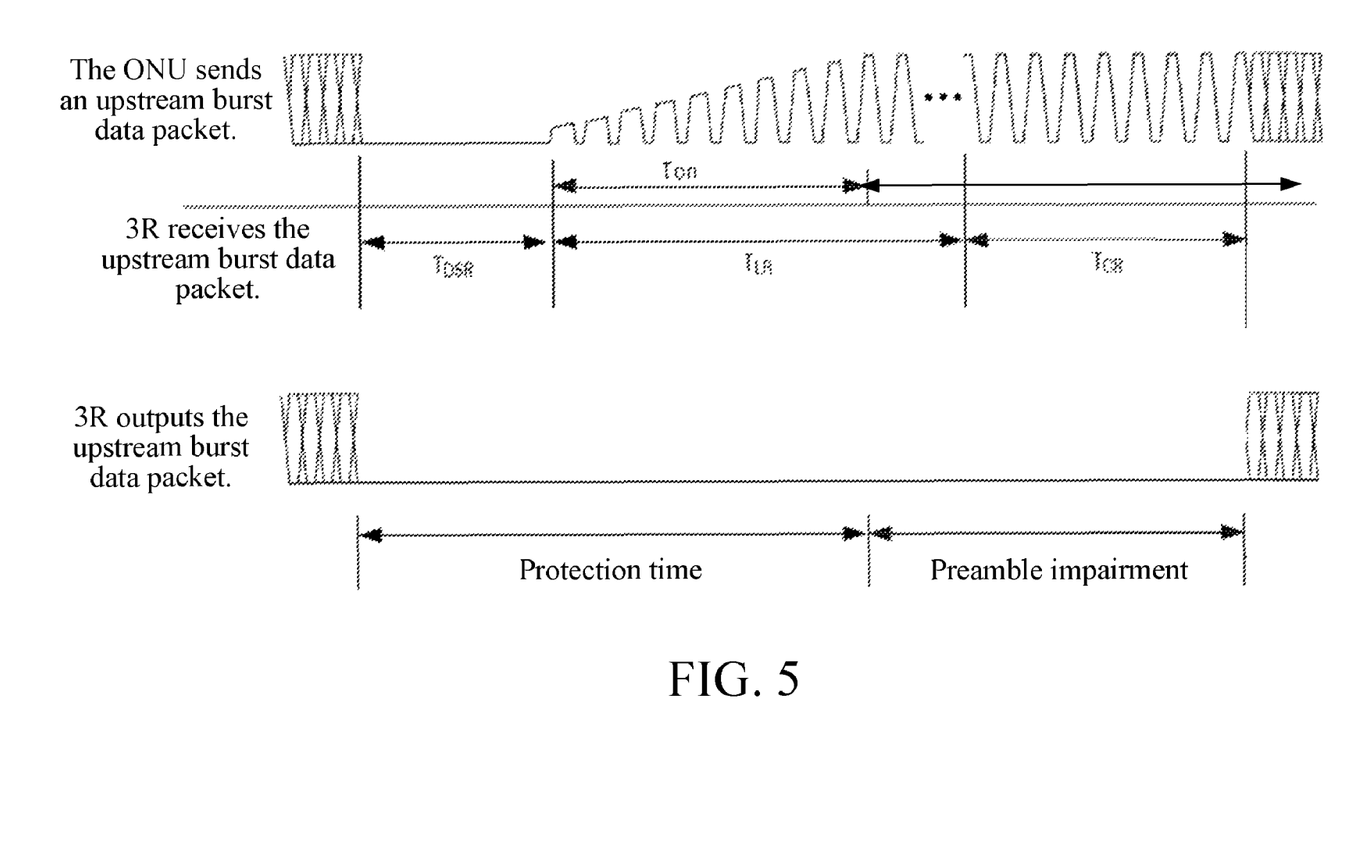
FIG. 5 is a timing chart of clock and data recovery performed on a data frame by a BCDR module in the prior art.

In the implementation of the present invention, the inventors find that the prior art has the following problems. As the upstream direction involves receiving burst data, the O/E conversion, amplification, and shaping need to be performed, and the BCDR module is adapted to correctly identify, receive, and recover the clock data. However, during such processing, if it is ensured that each burst data frame after O/E conversion, amplification, and shaping is correctly received and the clock data can be recovered, a certain adjustment period is required, thereby resulting in preamble impairment of the data frame. If the data frame is sent after the BCDR module performs the BCDR on the data frame, a portion is missing from the preamble in the data frame. FIG. 5 shows a timing chart of burst reception and clock and data recovery performed on the data frame by the O/E amplification shaping module and the BCDR module. In an upper part of FIG. 5, the timing chart shows a data frame received by the OEO extender box, in which $T_{DSR}$ denotes a burst interval, Ton denotes invalid data sent in a starting process of a burst transmitter laser of the ONU within the time period, $T_{LR}$ denotes potential recovery time of the transimpedance amplifier and the limiting amplifier of the O/E amplification shaping module within the time period, and $T_{CR}$ denotes BCDR clock recovery time within the time period. The preamble of the data frame spans the $T_{LR}$ and the $T_{CR}$, and a data part starting with a delimiter carried in the data frame is then followed. The subsequent part may also include residual parts of the preamble. In the lower part of FIG. 5, the timing chart of data frames after being processed by the O/E amplification shaping module and the BCDR module is shown, which includes an interval duration of bandwidth distribution, a preamble impairment duration, an unimpaired preamble duration, and a data part carried in the data frame. FIG. 5 shows a special situation in which all the preamble is consumed. Only the data parts carried in the data frame is left after the BCDR process performed by the BCDR module.

Therefore, the preamble impairment caused by O/E conversion, amplification, and shaping performed on the data frame by the O/E amplification shaping module and the BCDR performed on the data frame by the BCDR module may influence a subsequent receiver such as the OLTs or the subsequent OEO extender box in receiving the data frame correctly. For example, it is assumed that the preamble of the data frame has 44 bits. The O/E conversion, amplification, and shaping performed by the E/O amplification module and the BMCR process performed on the data frame by the BCDR module require 13 bits. In this case, the data frame only has a 31-bit preamble left. For subsequent OLTs that receive the data frame, the preamble of the data frame cannot satisfy the requirements on the byte number of the preamble specified in the protocol, such that the OLTs cannot correctly receive the data frame, and as a result, the OEO manner cannot actually realize data transmission extension.

SUMMARY OF THE INVENTION

Accordingly, the embodiment of present invention is directed to a method for realizing data transmission extension in a PON, which is applicable to the realization of data transmission extension in an OEO manner.

The present invention is directed to a device for realizing data transmission extension in a PON, which is applicable to the realization of data transmission extension in an OEO manner.

The present invention is directed to a system for realizing data transmission extension in a PON, which is applicable to the realization of data transmission extension in an OEO manner.

According to the objectives, the technical solutions of the present invention are realized as follows.

The present invention provides a device for realizing data transmission extension in a PON. In an upstream direction, the device includes an optical-electrical (O/E) amplification shaping module, a burst-mode clock and data recovery (BCDR) module, and an electrical-optical (E/O) amplification module. The device further includes a delimiter matching module and a preamble buffering and compensating module.

The delimiter matching module is adapted to receive a data frame sent by the BCDR module and determine a location of a delimiter in the data frame. The data frame is O/E converted, amplified, and shaped by the O/E amplification module, and then the BCDR module performs clock and data recovery processing on the processed data frame.

The preamble buffering and compensating module is adapted to receive and buffer the data frame output by the delimiter matching module, insert a compensation preamble in the data frame according to the location of the delimiter in the data frame determined by the delimiter matching module, and send the data frame to the E/O amplification module according to a retiming clock in the downstream direction.

The present invention provides a system for realizing data transmission extension in a PON, which includes optical network units (ONUs) and optical line terminals (OLTs). The system further includes OEO equipment.

The OEO equipment is adapted to receive a data frame sent by the ONUs, perform O/E conversion, amplification, and shaping, perform burst-mode clock and data recovery operation, define a preamble and data for the obtained recovered data frame, compensate the preamble of the data frame, perform O/E conversion and amplification on the data frame with the preamble compensated, and send the data frame to the OLTs.

The present invention provides a method for realizing data transmission extension in a PON, which is applicable to the extension of a distance between OLTs and ONUs. OEO equipment is disposed between the OLTs and the ONUs. The method includes the following steps.

The OEO equipment performs O/E conversion, amplification, and shaping on a data frame received from the ONU through a passive optical splitter, and performs burst-mode clock and data recovery, so as to obtain the data frame after the BCDR.

The OEO equipment defines a preamble and data for the data frame after the BCDR, compensates the preamble, performs O/E conversion and amplification on the data frame with the preamble compensated, and sends the data frame to the OLTs.

As seen from the above solutions, the method, the device, and the system provided in the embodiments of the present invention are applied in the data transmission extension system (the OEO equipment is included between the OLTs and the ONUs). As a preamble compensation function for a data frame is configured in the OEO equipment, the preamble impairment caused by the O/E conversion, amplification, and shaping performed on the data frame by the O/E amplification module and the BCDR performed on the data frame by the BCDR module in the OEO equipment can be compensated, thereby preventing that the subsequent receiver cannot correctly receive the data frame due to the preamble impairment of the data frame. Therefore, the present invention realizes the data transmission extension in an OEO manner.

DETAILED DESCRIPTION OF THE EMBODIMENTS

In order to make the objectives, technical solutions, and advantages of the present invention more comprehensible, the embodiments of the present invention are further described in detail in the following with reference to the accompanying drawings.

In order to realize the data transmission extension in an OEO manner, a problem that a subsequent receiver cannot correctly receive a data frame due to the preamble impairment of the data frame transmitted in an upstream direction caused by the OEO equipment has to be solved. Therefore, in the embodiments of the present invention, the OEO equipment is reconstructed. The equipment is not only able to perform E/O conversion, burst reception, power amplification, and O/E conversion on a data frame transmitted in an upstream direction, but also able to compensate the preamble impairment of the data frame caused by burst reception.

In the embodiments of the present invention, the reconstructed OEO equipment is referred to as 3R equipment.

Figure 6:
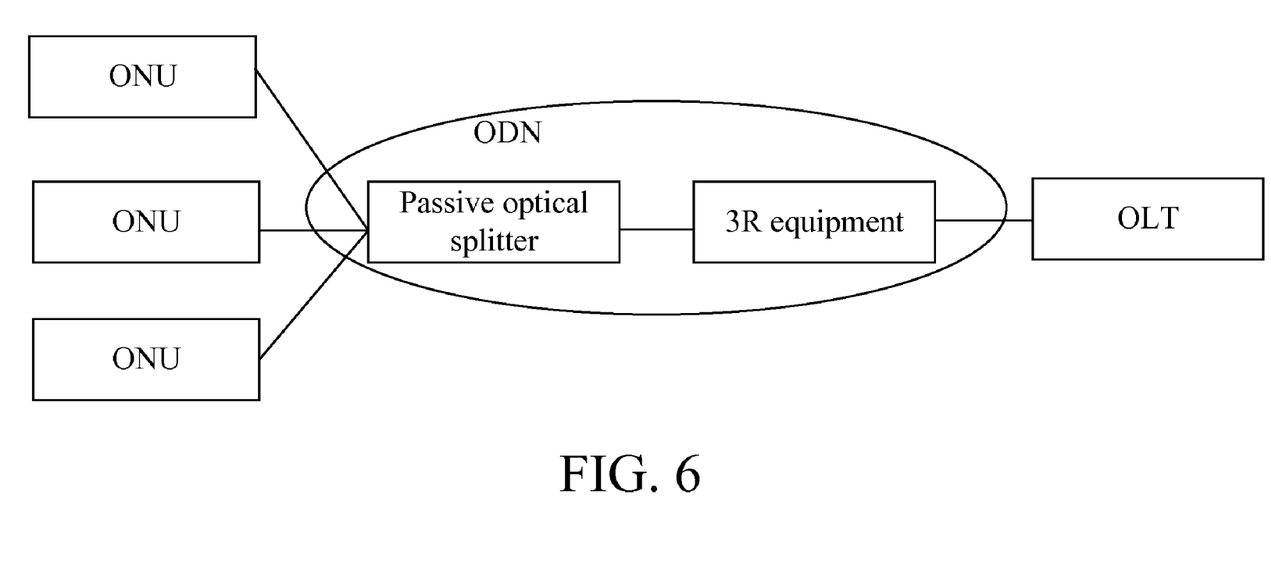
FIG. 6 is a schematic structural view of a data transmission extension network in a PON realized in an OEO manner according to an embodiment of the present invention.

FIG. 6 is a schematic structural view of a data transmission extension network in a PON realized in an OEO manner according to an embodiment of the present invention. The 3R equipment provided in the embodiments of the present invention is configured between a passive optical splitter and optical line terminals (OLTs). The 3R equipment divides an optical distribution network (ODN) into an ODN 1 and an ODN 2. A burst mode is adopted for transmitting data in an upstream direction between the 3R equipment and ONUs, and a continuous mode is adopted for transmitting data in a downstream direction. The continuous mode is adopted for transmitting data in both upstream direction and downstream direction between the 3R equipment and the OLTs.

In the embodiments of the present invention, the continuous mode for transmitting data means that a transmitter laser (existing in any one of the ONU equipment, 3R equipment, and OLT equipment) does not need to be turned on before the data is sent and turned off after the data is sent. Instead, the transmitter laser is in an ON state all the time.

In the embodiments of the present invention, considering the compatibility with the existing ODN interface standards in the PON, the 3R equipment may be configured at an original location of the OLT in the PON and then the OLT is configured at an extended location. Such configuration has the following benefits.

1) An interface standard for the 3R equipment between the passive optical splitter and the ONUs may continue to use the original OLT interface standard. An ONU interface standard remains unchanged.

2) A distance for data transmission extension mainly depends upon an optical power budget between the 3R equipment and the OLTs. That is, in an upstream direction, when the power of the data sent by the 3R equipment to the OLT side attenuates after passing through the optical fiber for a certain distance, it still satisfies the sensitivity for the OLT to receive the data. In a downstream direction, when the power of the data sent by the OLT attenuates after passing through the optical fiber for a certain distance, the 3R equipment can still normally receive data at the OLT side.

Specifically, the 3R equipment may be configured at a location having a distance less than or equal to 20 kilometers away from the ONUs.

Figure 7:
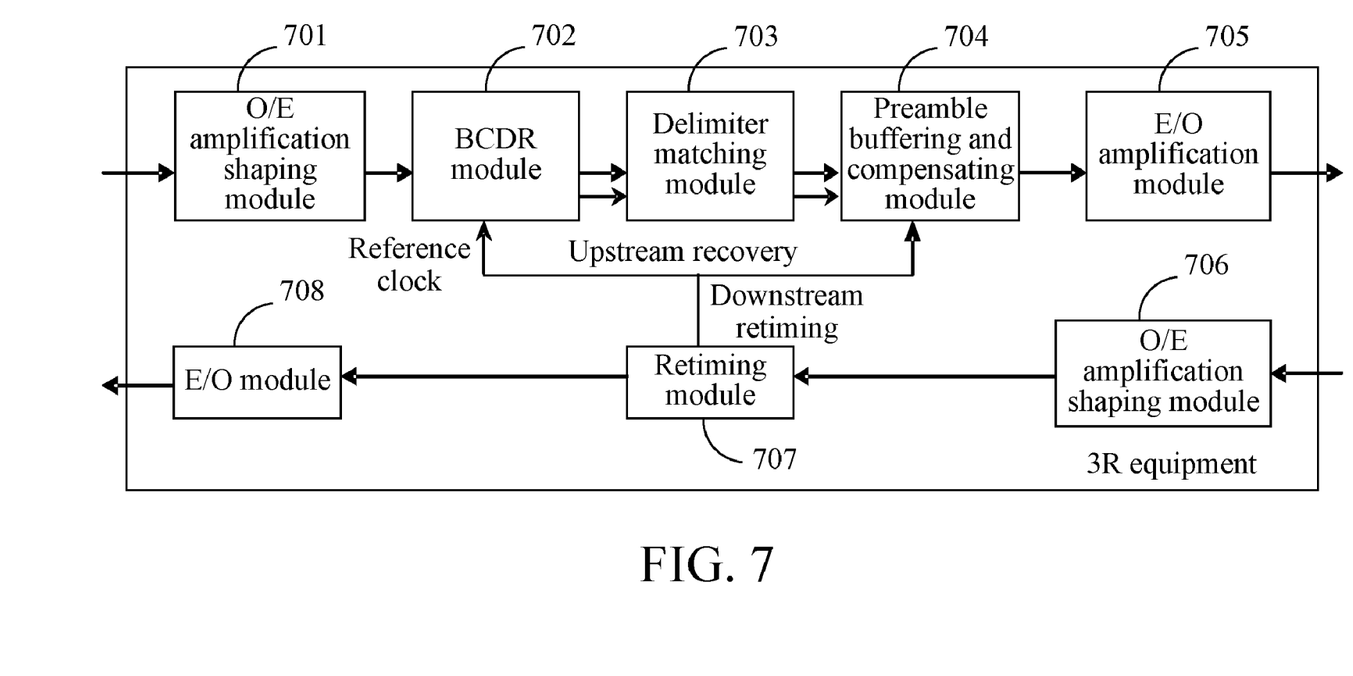
FIG. 7 is a schematic structural view of 3R equipment according to an embodiment of the present invention.

FIG. 7 is a schematic structural view of 3R equipment according to an embodiment of the present invention. As shown in FIG. 7, in an upstream direction, the 3R equipment includes an O/E amplification shaping module 701, a burst-mode clock and data recovery (BCDR) module 702, a delimiter matching module 703, a preamble buffering and compensating module 704, and an E/O amplification module 705. In a downstream direction, the 3R equipment includes an O/E amplification shaping module 706, a retiming module 707, and an E/O module 708.

When the data is transmitted in the upstream direction, the function of each module is described as follows.

The O/E amplification shaping module 701 in the upstream direction is adapted to receive a data frame in the upstream direction, perform O/E conversion, amplification, and shaping on the data frame, and send the processed data frame to the BCDR module 702.

The BCDR module 702 is adapted to receive the data frame sent by the O/E amplification shaping module 701 in the upstream direction after performing the O/E conversion, amplification, and shaping, perform clock and data recovery on the data frame by taking a downstream retiming clock as a reference clock, and send the recovered data frame to the delimiter matching module 703. At the same time, an upstream recovered clock is also sent to the delimiter matching module 703.

The delimiter matching module 703 is adapted to search the data frame after performing the clock and data recovery, determine a data location and a preamble location after a delimiter is found through searching, and send the data frame carrying data to the preamble buffering and compensating module 704 according to the upstream recovered clock received from the BCDR module 702.

The preamble buffering and compensating module 704 is adapted to buffer the data frame carrying delimiter data received from the delimiter matching module 703, insert a compensation preamble at a preamble insertion location determined by the delimiter matching module 703, and send the data frame inserted with the compensation preamble to the E/O amplification module 705 according to the downstream retiming clock obtained from the retiming module 707.

In the embodiment of the present invention, the upstream recovered clock may also be adopted when sending the data frame inserted with the compensation preamble to the E/O amplification module 705 (not shown in FIG. 7).

The E/O amplification module 705 is adapted to perform E/O conversion and power amplification on the data frame after preamble compensation received from the preamble buffering and compensating module 704 and send the processed data frame.

When the data is transmitted in the downstream direction, the function of each module is described as follows.

The O/E amplification shaping module 706 in the downstream direction is adapted to receive a data frame in the downstream direction, perform O/E conversion, amplification, and shaping on the data frame, and send the processed data frame to the retiming module 707.

The retiming module 707 is adapted to receive the data frame sent by the O/E amplification shaping module 706 in the downstream direction after performing O/E conversion, amplification, and shaping, and perform de-jittering on a downstream clock of the recovered data frame to generate a downstream retiming clock, and send the data frame to the E/O module 708 according to the downstream retiming clock.

The E/O module 708 is adapted to perform E/O conversion on the data frame received from the retiming module 707 and send the processed data frame.

In the embodiment of the present invention, the delimiter matching module 703 specifically includes a clock module and a delimiter determining module. The clock module is adapted to receive an upstream recovered clock obtained after the data frame is O/E converted, amplified, and shaped and then is clock and data recovered by the BCDR module 702 and send the upstream recovered clock to the delimiter determining module. The delimiter determining module is adapted to send the data frame after the clock and data recovery to the preamble buffering and compensating module according to the upstream recovered clock.

In the embodiment of the present invention, the retiming module 707 functions to recover the downstream clock of the data frame and then perform de-jittering on the downstream clock to generate a downstream retiming clock, that is, to generate a downstream retiming clock having a stable phase. Such a process may be realized through the prior art. The generated downstream retiming clock mainly includes the effects on the following three aspects.

Firstly, the downstream retiming clock is sent to the BCDR module 702 in the upstream direction and is taken as a reference clock for the BCDR module 702, so as to realize multi-phase sampling of the upstream data frame to recover the valid data and clock.

Secondly, the downstream retiming clock is sent to the preamble buffering and compensating module 704 in the upstream direction and is adopted by the preamble buffering and compensating module 704 in sending the data frame after preamble compensation. As the de-jittering process has been performed on the downstream retiming clock, when the data frame after preamble compensation is sent through the downstream retiming clock, the data frame after preamble compensation is enabled to maintain a stable and unified phase, which is helpful for being received by the OLTs. Of course, the de-jittering process may not be performed. At this time, the phase may be not very stable.

In addition, as the upstream clock adopted by the ONUs to transmit data in the PON is obtained by tracking the downstream clock adopted by the OLTs to transmit data in the downstream direction, the upstream clock and the downstream clock are homologous, such that the frequencies thereof are consistent and only the phase is changed. Therefore, the 3R equipment may use the downstream retiming clock obtained in the downstream direction to send the data frame after preamble compensation.

Thirdly, in the downstream direction, the data frame passing through the 3R equipment also uses the downstream retiming clock to modify the phase. As the processing clock adopted by the ONUs to process the data frame is obtained by tracking the downstream clock adopted by the OLTs to transmit data in the downstream direction, the data frame having a stable phase is sent in the downstream direction, which also facilitates the reception by the ONU and recovery of the clock signal.

In the embodiment of the present invention, the preamble buffering and compensating module 704 inserts the compensation preamble at a preamble location of the buffered and output data frame according to the data location and the preamble location determined by the delimiter matching module 703. Two manners may be adopted for inserting the compensation preamble at the preamble location. One manner is to compensate the impaired preamble only. The other manner is to replace the whole preamble at the preamble location defined by the delimiter with the compensation preamble. The two manners are illustrated in the following respectively.

1) Only the impaired preamble is compensated.

The bit number of the impaired preamble caused by O/E conversion, amplification, and shaping by the O/E amplification shaping module 701 and the BCDR performed on the data frame by the BCDR module 702 in the upstream direction may be estimated according to the product specification or experiments and may be set in the preamble buffering and compensating module 704 in advance. The preamble buffering and compensating module 704 further sets a preamble generating rule (or referred to as a format) (the rule is the same as the preamble rule adopted by the ONUs and OLTs to generate data frames) in advance. Once the delimiter matching module 703 determines a frame head of the buffered data frame, a preamble location of the impaired preamble is determined according to the set bit number of the impaired preamble, so that a preamble is generated according to the set preamble generating rule, and the generated corresponding parts are filled in the preamble location of the impaired preamble.

2) The whole preamble at the preamble location defined by the delimiter of the data frame is replaced by the compensation preamble.

A preamble generating rule is preset in the preamble buffering and compensating module 704 (the rule is the same as the preamble rule adopted by the ONUs and OLTs to generate data frames). Once the preamble buffering and compensating module 704 determines the preamble location of the buffered data frame, a preamble is generated according to the set preamble generating rule, so as to overwrite the preamble at the preamble location of the buffered and output data frame.

FIG. 7 only demonstrates a situation that the 3R equipment processes one data frame. In practical implementation, the received data frames may be processed in sequence in the upstream direction and are sent to the OLTs in a continuous manner, thereby facilitating the reception by the OLTs.

The system provided in the embodiment of the present invention can perform the OEO conversion in the upstream or downstream direction in the PON at the same time. One 3R equipment is sufficient for extending a PON coverage effectively, thereby avoiding introducing too many active equipment in the PON. It is ensured that the preamble of the data frame with the transmission extended through the 3R equipment is not impaired, such that the reception by a subsequent OLT and the time recovery are not affected. The burst mode for sending a data frame in the upstream direction in the PON is enabled to be changed into a continuous mode and the phases in the upstream direction are aligned, thereby decreasing the reception difficulty for the OLTs. This is particularly important in high-speed PON, that's because a high-speed burst reception optical component in the OLT is currently a bottleneck for increasing a rate. The 3R equipment is simple and easy for implementation and has a low cost, which is thus suitable for market demands and capable of being widely applied rapidly.

Figure 8:
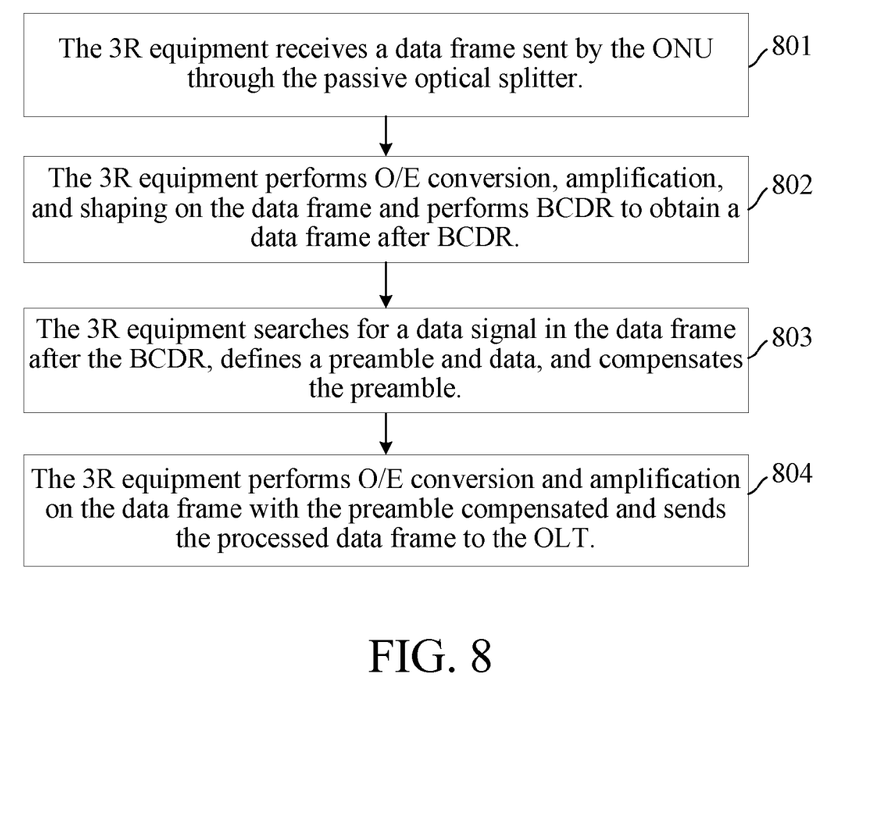
FIG. 8 is a flow chart of a method for realizing data transmission extension according to an embodiment of the present invention.

FIG. 8 is a flow chart of a method for realizing data transmission extension according to an embodiment of the present invention. 3R equipment is disposed between OLTs and ONUs. The 3R equipment is disposed at an OLT side and connected to the ONUs through a passive optical splitter. The specific steps are as follows.

In Step 801, the 3R equipment receives a data frame sent by the ONU through the passive optical splitter.

In Step 802, the 3R equipment performs O/E conversion, amplification, and shaping on the data frame and performs BCDR to obtain a data frame after BCDR.

In Step 803, the 3R equipment searches for a data signal in the data frame after BCDR, defines a preamble and data, and compensates the preamble.

In this step, two compensation manners are included. One manner is to compensate the impaired preamble only. The other manner is to replace the whole preamble at the preamble location defined by the delimiter with the compensation preamble. The specific implementation is referred to the above descriptions.

In Step 804, the 3R equipment performs O/E conversion and amplification on the data frame with the preamble compensated and sends the processed data frame to the OLT.

Before the O/E conversion and amplification are performed on the data frame with the preamble compensated, a downstream retiming clock may also be obtained in the downstream direction or a clock output after the BCDR may continue to be used, so as to send the data frame with the preamble compensated to the O/E amplification module for performing the O/E conversion and amplification according to the obtained clock.

As the data frame received by the OLT has a complete preamble part (being compensated), the data frame can be correctly received.

A specific embodiment is given in the following.

In a time division multiplex (TDM)-PON, a Gigabit PON (GPON) has a fixed frame period and flexibly provides various upstream or downstream rates and optical split ratios, the adopted GPON encapsulation mode (GEM) is suitable for matching with any data service, and the GPON may well support the transmission of the TDM service data and has desired timing insurance, such that the GPON becomes a desirable solution for comprehensive service access and has been widely applied. This specific embodiment illustrates how to realize data transmission extension in the GPON.

The method provided in the embodiment of the present invention can perform OEO conversion in the upstream or downstream direction in the PON at the same time. One 3R equipment is sufficient for extending a PON coverage effectively, thereby avoiding introducing too many active equipment in the PON. It is ensured that the preamble of the data frame with the transmission extended through the 3R equipment is not impaired, such that the reception by a subsequent OLT and the time recovery are not affected. The burst mode for sending a data frame in the upstream direction in the PON is enabled to be changed into a continuous mode and the phases in the upstream direction are aligned, thereby decreasing the reception difficulty for the OLTs. This is particularly important in high-speed PON, that's because a high-speed burst reception optical component in the OLT is currently a bottleneck for increasing a rate. The 3R equipment is simple and easy for implementation and has a low cost, which is thus suitable for market demands and capable of being widely applied rapidly.

Figure 9:
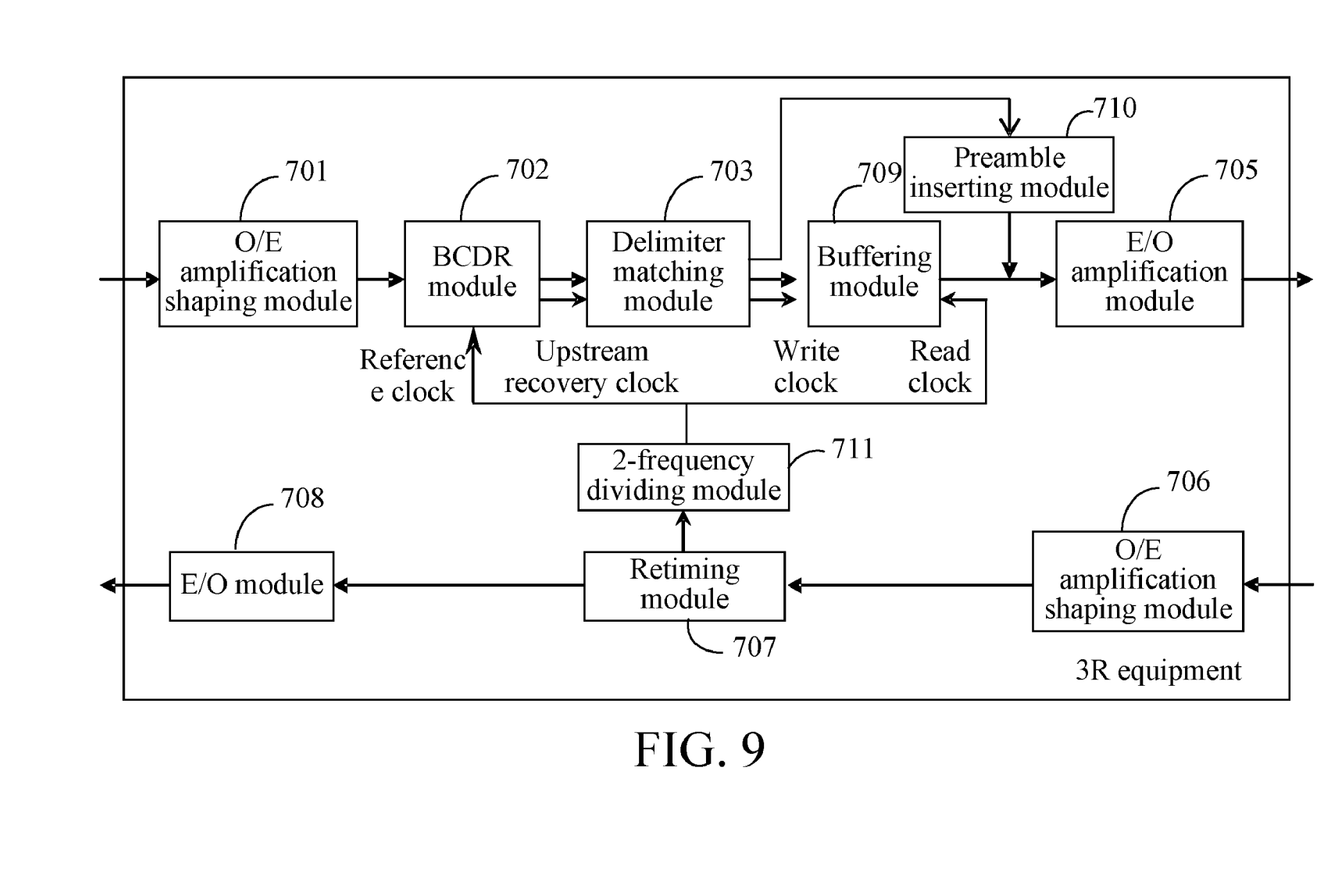
FIG. 9 is a schematic view of 3R equipment for data transmission extension in a GPON according to an embodiment of the present invention.

For the data transmission extension of the GPON, FIG. 9 is a schematic view of 3R equipment for data transmission extension in a GPON. Functions of most of the processing modules are the same as that in FIG. 7. Only the preamble buffering and compensating module 704 is replaced with two modules, that is, a buffering module 709 and a preamble insert module 710. In addition, a 2-frequency dividing module 711 is added between the retiming module and the buffering module.

The buffering module 709 is adapted to buffer a data frame carrying delimiter data received from the delimiter matching module 703 and send the data frame with the preamble compensated to the E/O amplification module 705 according to a downstream retiming clock adopted by the retiming module to perform 2-frequency division through the 2-frequency dividing module.

The preamble inserting module 710 inserts a compensation preamble at a preamble location that needs to be compensated according to the data location and the preamble location of the data frame defined by the delimiter matching module 703.

The preamble inserting module 710 is further adapted to insert a compensation preamble at the preamble location after receiving an inserting control signal sent by the delimiter matching module 703. The delimiter matching module 703 searches the data frame after clock and data recovery and sends the inserting control signal to the preamble inserting module 710 after the delimiter is found through searching.

Figure 10:
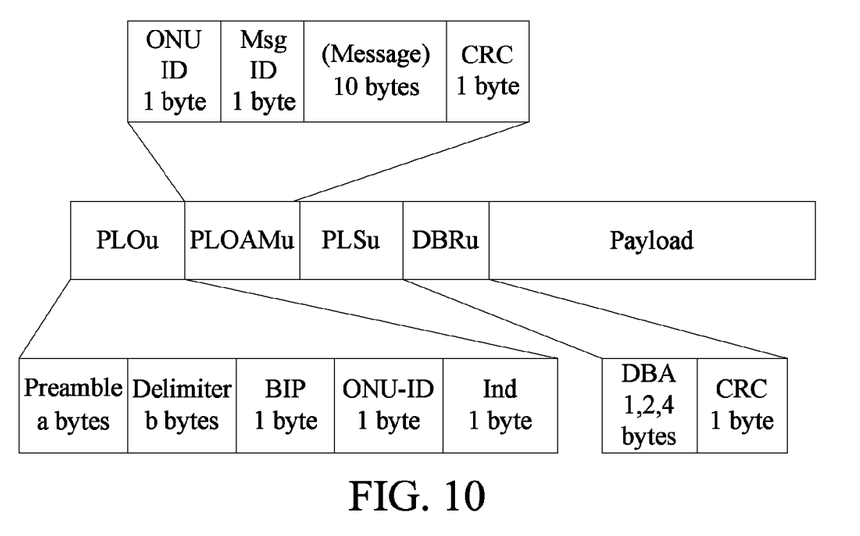
FIG. 10 shows a data frame carried in data and transmitted in a GPON according to an embodiment of the present invention.

The data frame transmitted in the GPON is as shown in FIG. 10. In FIG. 10, PLOU denotes a frame head of a data frame in the upstream direction. The a bytes indicate the preamble and the b bytes indicate the delimiter. In the protocol, it is specified that a preamble of a 1.25 Gpbs upstream data frame is 44 bits, a delimiter is 20 bits, and a pattern is 0xB5983. The delimiter matching module 703 in FIG. 9 determines a delimiter 0xB5983 to determine the frame head of the data frame through searching and buffers the data frame in the buffering module 709. A write clock of the buffer is an upstream clock output from the BCDR, that is, 1.25 GHz upstream clock. A clock adopted by the E/O amplification module 705 to read the buffer is a downstream retiming clock obtained from the retiming module, that is, 2.5 GHz downstream clock after the de-jittering process, and then the 2-frequency division is performed on the 2.5 GHz downstream clock to obtain a 1.25 GHz retiming clock. That's because the frequencies used in the upstream and downstream directions are different. The frequency division needs to be performed on the downstream retiming clock to obtain a frequency the same as that of the write clock of the buffer. Of course, other frequency dividing modules may also be used, such as a 4-frequency dividing module and a 16-frequency dividing module. The specific implementation may be determined according to a relation between the upstream rate and the downstream rate.

The device provided in the embodiment of the present invention can perform OEO conversion in the upstream or downstream direction in the PON at the same time. One 3R equipment is sufficient for extending a PON coverage effectively, thereby avoiding introducing too many active equipment in the PON. It is ensured that the preamble of the data frame with the transmission extended through the 3R equipment is not impaired, such that the reception by a subsequent OLT and the time recovery are not affected. The burst mode for sending a data frame in the upstream direction in the PON is enabled to be changed into a continuous mode and the phases in the upstream direction are aligned, thereby decreasing the reception difficulty for the OLTs. This is particularly important in high-speed PON, that's because a high-speed burst reception optical component in the OLT is currently a bottleneck for increasing a rate. The 3R equipment is simple and easy for implementation and has a low cost, which is thus suitable for market demands and capable of being widely applied rapidly.

All or a part of the contents in the technical solutions according to the embodiments may be implemented through software programs. The soft programs may be stored in a readable storage medium such as a hard disk in a computer, an optical disk, or a magnetic disk.

Specific embodiments of the present invention are described. The method according to the present invention can be improved properly in the implementation. Thus, it may be understood that the specific embodiments according to the present invention are only exemplary, which are not intended to limit the scope of the present invention.

What is claimed is:

1. A device for realizing data transmission extension in a passive optical network (PON), comprising:
   an optical-electrical (O/E) amplification shaping module;
   a burst-mode clock and data recovery (BCDR) module;
   an electrical-optical (E/O) amplification module;
   a delimiter matching module configured to receive a data frame sent by the BCDR module and determine a location of a delimiter in the data frame, wherein the O/E amplification shaping module performs an O/E conversion, an amplification and a shaping on the data frame, and the BCDR module performs a clock and data recovery processing on the data frame; and
   a preamble buffering and compensating module configured to receive and buffer the data frame output from the delimiter matching module, insert a compensation preamble in the data frame according to the location of the delimiter in the data frame determined by the delimiter matching module, and then send the data frame to the E/O amplification module according to a retiming clock in a downstream direction.

2. The device according to claim 1, wherein the delimiter matching module further comprises a clock module and a delimiter determining module and wherein:
   the clock module is configured to receive an upstream recovered clock which is obtained after the BCRD module performs the clock and data recovery processing on the data frame received by the BCDR module, and send the upstream recovered clock to the delimiter determining module; and
   the delimiter determining module is configured to send the data frame on which the clock and data recovery is performed to the preamble buffering and compensating module according to the upstream recovered clock.

3. The device according to claim 1, further comprising:
   an O/E amplification shaping module;
   a retiming module; and
   an E/O module in the downstream direction, wherein:
   the O/E amplification shaping module in the downstream direction is configured to receive a data frame for performing an O/E conversion, an amplification and a shaping, and send the data frame to the retiming module;
   the retiming module is configured to recover a clock from the data frame received from the O/E amplification shaping module in the downstream direction, perform a clock de-jittering on the recovered clock to generate a retiming clock having a stable phase, send the retiming clock to the BCDR module and the preamble buffering and compensating module, and send the data frame received from the O/E amplification shaping module in the downstream direction to the E/O module according to the retiming clock; and
   the E/O module is configured to receive the data frame sent from the retiming module, perform an E/O conversion on the received data frame and send the converted data frame;
   in the upstream direction, the BCDR module takes the received retiming clock as a reference clock, recovers an upstream recovered clock and the data frame, and sends the upstream recovered clock and the data frame to the preamble buffering and compensating module through the delimiter matching module.

4. The device according to claim 3, wherein the preamble buffering and compensating module further comprises:
   a buffering module configured to buffer the data frame with a determined delimiter location received from the delimiter matching module, and send the data frame with a preamble compensated to the E/O amplification module according to the retiming clock obtained by the retiming module or the upstream recovered clock obtained from the BCDR module through the delimiter matching module; and
   a preamble inserting module configured to insert the compensation preamble in the preamble location of the data frame with the determined delimiter output by the buffering module.

5. The device according to claim 4, wherein the preamble inserting module inserts the compensation preamble in the preamble location of the data frame with the determined delimiter output by the buffering module after receiving an inserting control signal sent by the delimiter matching module.

6. The device according to claim 4, further comprising:
   a frequency dividing module configured to perform frequency division processing on the retiming clock output by the retiming module and send the retiming clock after the frequency division processing to the BCDR module and the buffering module.

7. A device for realizing data transmission extension in a passive optical network (PON), comprising:
   a burst-mode clock and data recovery (BCDR) module configured to receive a data frame from a first optical-electrical (O/E) amplification shaping module and perform a clock and data recovery on the data frame;
   a delimiter matching module configured to receive a recovered clock and the data frame from the BCDR module and determine a location of a delimiter in the data frame; and
   a preamble buffering and compensating module configured to receive the data frame from the delimiter matching module according to the recovered clock, insert a compensation preamble in the data frame according to the location of the delimiter in the data frame and send the data frame after compensation to an electrical-optical (E/O) amplification module.

8. The device according to claim 7, further comprising a retiming module configured to:
   receive a data frame from a second O/E amplification shaping module;

recover a clock from the data frame received from the second O/E amplification shaping module;

perform a clock de-jittering on the clock recovered from the data frame received from the second O/E amplification shaping module to obtain a retiming clock;

send the retiming clock to the BCDR module and the preamble buffering and compensating module; and send the data frame received from the second O/E amplification shaping module to an E/O module.

9. The device according to claim 8, wherein the BCDR module configured to perform the clock and data recovery on the data frame by using the retiming clock as a reference clock to obtain the recovered clock.

10. The device according to claim 9, wherein the preamble buffering and compensating module is configured to send the data frame after compensation to the E/O amplification module according to the retiming clock or the recovered clock received from the delimiter matching module.

11. The device according to claim 10, further comprising a frequency dividing module configured to perform frequency division processing on the retiming clock and send the retiming clock after the frequency division processing to the BCDR module and the preamble buffering and compensating module.

* * * * *